United States Patent
Kubota

(10) Patent No.: US 7,660,434 B2
(45) Date of Patent: Feb. 9, 2010

(54) OBSTACLE DETECTION APPARATUS AND A METHOD THEREFOR

(75) Inventor: Susumu Kubota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 12/000,025

(22) Filed: Dec. 7, 2007

(65) Prior Publication Data

US 2008/0285798 A1 Nov. 20, 2008

Related U.S. Application Data

(62) Division of application No. 11/178,274, filed on Jul. 12, 2005, now abandoned.

(30) Foreign Application Priority Data

Jul. 13, 2004 (JP) ............................. 2004-205857
Apr. 20, 2005 (JP) ............................. 2005-122547

(51) Int. Cl.
*G06K 9/00* (2006.01)

(52) U.S. Cl. .................. 382/103; 382/104; 382/106; 382/154

(58) Field of Classification Search ................. 382/103, 382/104, 106, 154
See application file for complete search history.

(56) References Cited

U.S. PATENT DOCUMENTS 6,985,075 B2 * 1/2006 Takeda ....................... 340/435

FOREIGN PATENT DOCUMENTS

JP 2000-293693 10/2000
JP 2001-076128 3/2001
JP 2002-352225 12/2002

OTHER PUBLICATIONS

Leeuwen et al., Vehicle Detection with a Mobile Camera, IEEE Robotics & Automation Magazine, Mar. 2005, pp. 37-43.*
Notice of Reasons for Rejection, mailed Jul. 14, 2009, from the Japanese Patent Office in Japanese Patent Application No. 2005-122547 (2 pages), and English language translation thereof (2 pages).

* cited by examiner

*Primary Examiner*—Vikkram Bali
*Assistant Examiner*—Daniel Zeilberger
(74) *Attorney, Agent, or Firm*—Finnegan, Henderson, Farabow, Garrett & Dunner, L.L.P.

(57) ABSTRACT

An apparatus of detecting an object on a road surface includes a stereo set of video cameras mounted on a vehicle to produce right and left images, a storage to store the right and left images, a parameter computation unit to compute a parameter representing road planarity constraint based on the images of the storage, a corresponding point computation unit to compute correspondence between a first point on one of the right and left images and a second point on the other, which corresponds to the first point, based on the parameter, an image transformation unit to produce a transformed image from the one image using the correspondence, and a detector to detect an object having a dimension larger than a given value in a vertical direction with respect to the road surface, using the correspondence and the transformed image.

2 Claims, 10 Drawing Sheets

OBSTACLE DETECTION APPARATUS AND A METHOD THEREFOR

CROSS-REFERENCE TO RELATED APPLICATIONS

This is a division of application Ser. No. 11/178,274, filed Jul. 12, 2005 now abandoned, which is based upon and claims the benefit of priority from prior Japanese Patent Applications No. 2004-205857, filed Jul. 13, 2004; and No. 2005-122547, filed Apr. 20, 2005, the entire contents of all of which are incorporated herein by reference.

BACKGROUND OF THE INVENTION

1. Field of the Invention

The present invention relates to an obstacle detection apparatus, particularly to an obstacle detection apparatus to detect an obstacle on a road such as a preceding vehicle surround a vehicle, a parking vehicle or a pedestrian.

2. Description of the Related Art

It is important for realizing car safety support system or automatic driving system to detect obstacles in the surrounding environment. There are two methods to detect obstacles. One is to use active sensors such as laser radar or millimeter wave radar. The other is to use passive sensors such as video cameras.

A system which uses video cameras is capable of detecting not only obstacles but also lane markings on the road. This is an advantage of a system which uses video cameras. There is a big advantage capable of realizing a comparatively low cost system by use of a general-purpose device such as a camera.

It is possible to detect obstacles with a single camera system by using techniques such as motion stereo or pattern recognition. However, the system requires a bulky calculation amount to make it difficult to perform a real-time processing, and must be improved in precision, too. For the reasons, it is practical to obtain stereovision by using two or more cameras. The stereo vision is based on the principle of triangulation.

Suppose there are two cameras, left and right, and the relative position between the cameras are known. The three-dimensional position of an object can be obtained if the correspondence of the projected images of the object on the left and the right cameras is provided.

Accordingly, in stereovision, a work called with calibration for obtaining parameters concerning a positional relation between the camera and a work called with corresponding point search for obtaining correspondence relation between images are necessary.

It is necessary for performing a calibration of conventional stereo cameras to capture a number of points known and dispersed in three-dimension position and provide a corresponding relation of the projection points of the captured points between the cameras. This needs a large amount of labor.

It is necessary for knowing a distance from each of the points to an object on an image to do corresponding point search for all points. However, it is not always possible to find correct correspondence for all the points in a pair of images. Wrong distance information is provided when a set of wrong corresponding points are given. This is very undesirable in view of support of safe driving of a car.

On the other hand, if we only need to distinguish obstacle areas from a road area, there is a method which does not need correspondence search nor complicated calibration.

Suppose a point on a road surface is projected to a point (u, v) on the left image and point (u', v') on the right image, the relation between (u, v) and (u', v') is expressed by the following equation:

$$u' = \frac{h_{11}u + h_{12}v + h_{13}}{h_{31}u + h_{32}v + h_{33}}, v' = \frac{h_{21}u + h_{22}v + h_{23}}{h_{31}u + h_{32}v + h_{33}} \quad (1)$$

This is referred to as a road planarity constraint equation hereinafter. $h=\{h11, h12, h13, h21, h22, h23, h31, h32, h33\}$ represents a parameter dependent upon a position and posture of each camera to the road surface, a focal distance of optical lens of each camera, and an image origin. This is previously obtained from a set of right and left projection points of points not less than four points on the road surface (ui, vi) (u'i, v'i) $\{i=1, 2, \ldots, N\}$. If an arbitrary point P (u, v) on one image is assumed to exist on the road surface, a corresponding point P' (u', v') on the other image is obtained by this relational equation. If the point P exists on the road surface, the points P and P' are a set of correct corresponding points. Therefore, a small partial image around the point P matches a small partial image around the point P'.

On the contrary, if the point P does not exist on the road surface, the points P and P' are not a set of correct corresponding points. In this case, the partial images do not match well.

Accordingly, it can be determined whether or not an arbitrary point on the image exists on the road surface by comparing the partial images based on the correspondence provided by the equation (1).

This technique is called a plane projection stereo method and disclosed in Japanese Patent Laid-Open No. 2001-76128, for example. The plane projection stereo method has an advantage that calibration is easy and corresponding point search is not necessary. Though this technique can separate a road area and an obstacle area, it has a problem that it cannot grasp the precise position and distance.

As above described, when an obstacle is detected by conventional stereovision, a complicated calibration work needs. There is a problem on reliability of measurement so that the failure of corresponding point searching results in providing error distance information. On the other hand, where an obstacle is detected by a plane projection stereo method, there is a problem on precision of measurement in terms of position and distance.

BRIEF SUMMARY OF THE INVENTION

An aspect of the present invention provides an apparatus of detecting an object on a road surface comprising: a stereo set of video cameras mounted on a vehicle to produce right and left images on a road surface; an image storage unit configured to store the right and left images; a parameter computation unit configured to compute a parameter representing road planarity constraint based on the images stored in the image storage unit; a corresponding point computation unit configured to compute correspondence between a first point on one image of the right and left images on the road surface and a second point on other image of the right and left images, which corresponds to the first point, based on the parameter; an image transformation unit configured to produce a transformed image from the one image using the correspondence; and a detector to detect an object having a dimension larger than a given value in a substantially vertical direction with respect to the road surface, using the correspondence and the transformed image.

Another aspect of the present invention provides a method of detecting an object on a road surface comprising: acquiring right and left images by a set of stereo video cameras mounted on a vehicle; storing the right and left images in a storage unit; obtaining a parameter representing road planarity constraint based on the right and left images stored in the storage unit; computing the correspondence between a first point set to one image of the right and left images on the road surface and a second point on other image of the right and left images, which corresponds to the first point, based on the parameter; generating a transformed image from the one image using the correspondence; and detecting as an obstacle an object having a height larger than a given value with respect to the road surface, using the correspondence and the transformed image.

DETAILED DESCRIPTION OF THE INVENTION

First Embodiment

Figure 1:
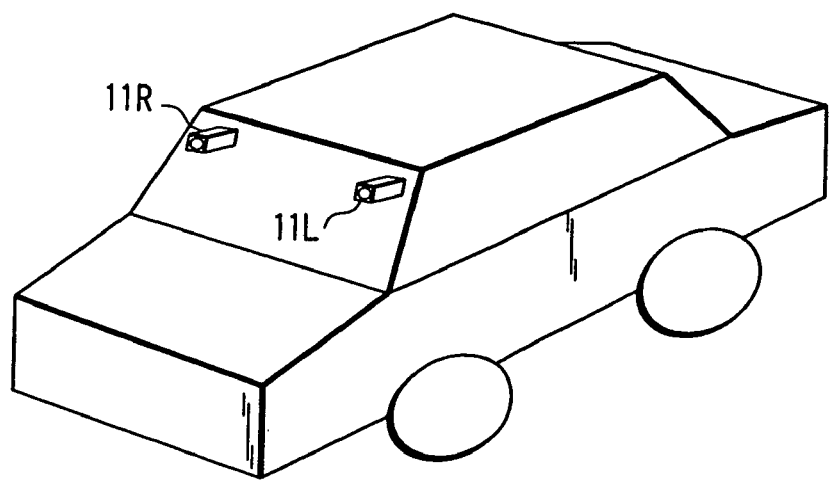
FIG. 1 shows a perspective view of a car mounted with two video cameras and an obstacle detection apparatus according to a first embodiment of the present invention.

An obstacle detection apparatus of the first embodiment of the present invention uses left and right video cameras 11L and 11R mounted on a car at right and left front positions thereof as shown in FIG. 1. These video cameras 11L and 11R are considered on a camera model according to the following assumption:

(1) An area comparatively far from the cameras is set to an object area.

(2) The distance between the left and the right cameras with respect to the direction of the camera's optical axis is small.

(3) The optical axes of the right and left cameras are approximately parallel with each other and toward an approximately horizontal direction, and the vertical axis of an imaging surface is toward an approximately vertical direction.

Omission of the above assumption does not affect the implementation of the present invention. However, if the present embodiment is based on the above assumption, necessary computation is simplified to be more practical.

If Z axis is in parallel with the optical axis of the camera, and the height of the road surface is 0, a projection point to an image of a point (X, 0, Z) on a road surface is assumed (u, v). If Z axis is in parallel with the optical axis of the camera, the relational equation (1) is simplified by the above assumption as expressed by the following equation (2):

$$\begin{pmatrix} u \\ v \end{pmatrix} = \begin{pmatrix} a & b \\ c & d \end{pmatrix} \begin{pmatrix} X/Z \\ 1/Z \end{pmatrix} + \begin{pmatrix} e \\ f \end{pmatrix} \quad (1')$$

Projection points (ul, vl) (ur, vr) of points existing on the road surface to the right and left images are associated with each other by the affine transformation based on the equation (1') as shown by the following equation.

$$\begin{pmatrix} u_r \\ v_r \end{pmatrix} = \begin{pmatrix} a_t & b_t \\ c_t & d_t \end{pmatrix} \begin{pmatrix} u_1 \\ v_1 \end{pmatrix} + \begin{pmatrix} e_t \\ f_t \end{pmatrix} \quad (1'')$$

In the above description, the road surface is assumed Y=0 for simplification. However, even if the road surface has a tilt with respect to the Z axis as expressed by Y=αZ+β, the projection points of a point existing on the road surface to the right and left images are associated with each other by affine transformation similarly. The parameter of this affine transformation can be computed using correspondence relation between feature points not less than four points existing on the road surface.

In a conventional plane projection stereo method, the hypothesis test is performed based on assumption that a point of interest is a road area. However, this method is not very reliable for several reasons. Firstly, a mirrored image of an obstacle in a reflective surface such as wet road surface in the rain seemingly has a negative height thus fails the hypothesis test. Secondly, specular reflection sometimes causes significant difference between the left and the right images which affects the accuracy of the hypothesis test.

In an embodiment of the present invention, projection points in the right and left images on the road surface correspond to each other according to a relational expression such as the equation (3). Further, it is determined whether there is an obstacle having a height more than a given height at a point on the road by assuming obstacles stand nearly perpendicular to a road surface. An example of this determination method will be described hereinafter.

Figure 2:
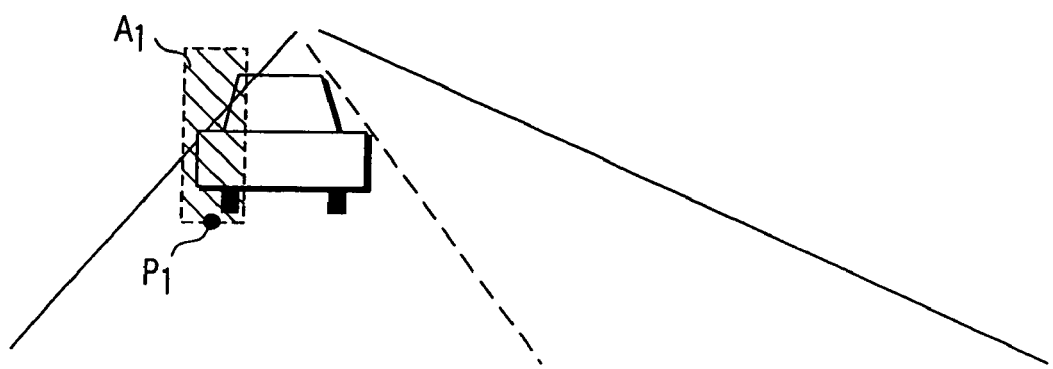
FIG. 2 is a diagram showing a image captured with a left side video camera.
Figure 3:
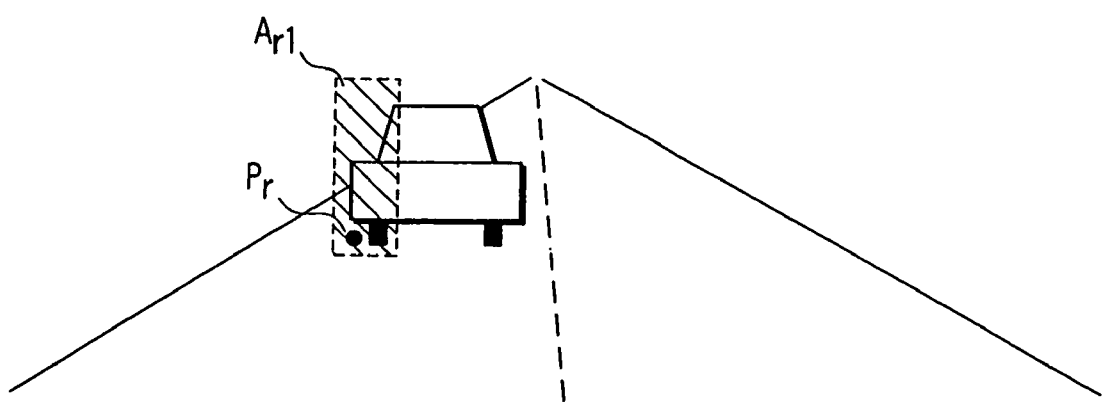
FIG. 3 is a diagram showing a image captured with a right side video camera.
Figure 4:
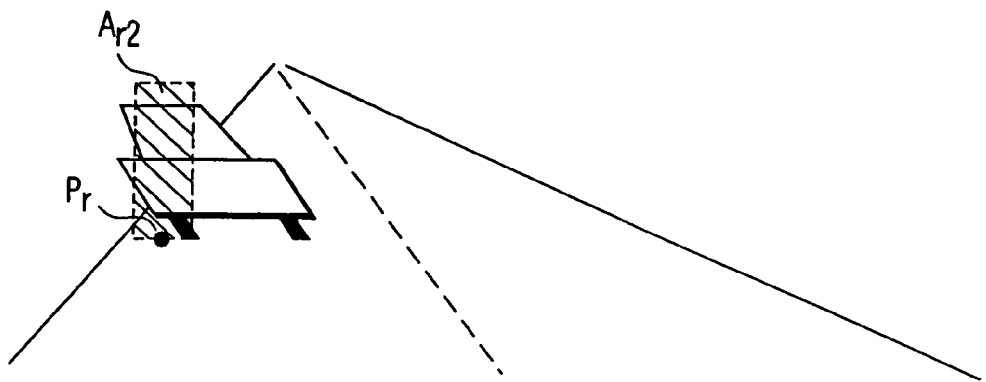
FIG. 4 is a diagram showing a transformed image of the right image.

FIG. 2 shows an example of the left image captured by the left video camera, FIG. 3 shows an example of the right image captured by the right video camera, and FIG. 4 shows a transformed image obtained by subjecting the image of FIG. 2 to affine transformation. When a point P1 of FIG. 2 is assumed to be included in a road region, a corresponding point of FIG. 3 is set to Pr. When an area A1 including the point P1 and spreading upward from the point P1 as shown in FIG. 2 is considered, if this area A1 is a road area, it should match with an area Ar2 of FIG. 4.

On the other hand, if the area A1 is an obstacle grounded at the point P1, it should match with an area Ar1 of FIG. 2. Accordingly, it is possible to determine whether the point P1 is a road area or an obstacle by comparing the region A1 with both regions Ar1 and Ar2.

Figure 5:
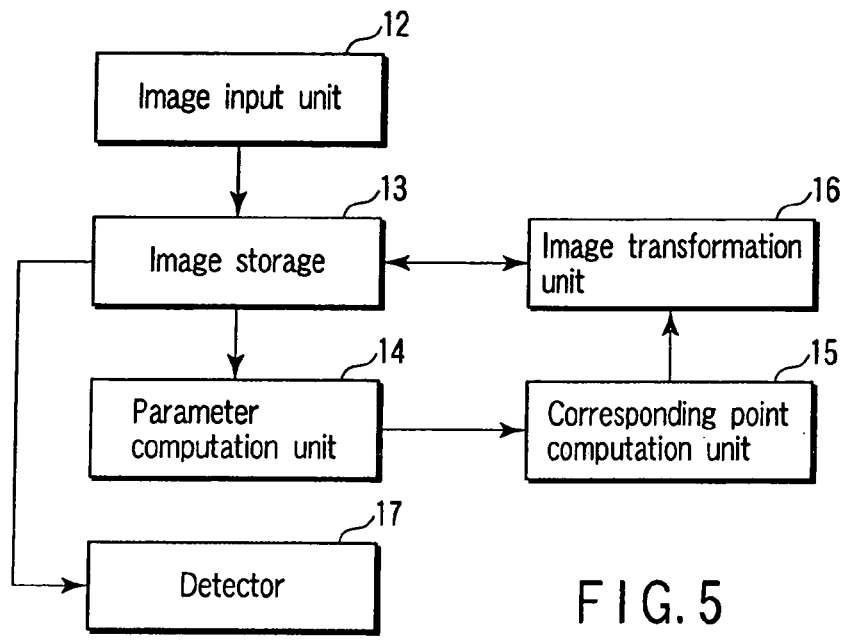
FIG. 5 is a block circuit diagram of the obstacle detection apparatus of the first embodiment of the present invention.

The present embodiment is based on the above determination method, and identify an obstacle on a road surface and a road area by using two video cameras mounted on a car as shown in FIG. 1. In other words, it is assumed to detect an obstacle existing on a road plane such as a pedestrian, a preceding car and a parked car, using two right and left video cameras 11L and 11R mounted on a car as shown in FIG. 1. FIG. 5 shows a schematic configuration of an obstacle detection apparatus of the present embodiment, which comprises an image input unit 12, an image storage unit 13, a parameter computation unit 14, a corresponding point computation unit 15, an image transformation unit 16 and a detection unit 17.

This obstacle detection apparatus computes a relational equation (referred to as road planarity constraint) established between projection position on right and left images at a point on the road surface to identify an obstacle existing on the road surface and a road area. In this obstacle detection apparatus, the image storage unit 13 stores images input by the right and left video cameras 11L and 11R of the image input unit in an image memory.

The parameter computation unit 14 computes the parameter of the road planarity constraint on the basis of two images captured by the right and left video cameras 11L and 11R, respectively, and stored in the image storage unit 13, that is, the images shown in FIGS. 2 and 3. A concrete computation of the parameter is done as follows.

The parameter computation unit 14 computes a road planarity constraint of the road surface with a vanishing point and two lane marking lines obtained by the feature extractor 3 while the car is stopping. Suppose a point (X, Y, Z) in a three-dimensional space is projected to a point (u, v). The relation between (u, v) and (X, Y, Z) is expressed as follows:

$$u = \frac{h_{11}X + h_{12}Y + h_{13}Z + t_1}{h_{31}X + h_{32}Y + h_{33}Z + t_3} \quad (2)$$

$$v = \frac{h_{21}X + h_{22}Y + h_{23}Z + t_2}{h_{31}X + h_{32}Y + h_{33}Z + t_3}. \quad (3)$$

h=(h11, h12, ..., t3), and T indicates parameters concerning the posture of the camera, a position thereof, a focal distance and the center of the image. Since a uniform scalar change of the parameters does not change the relationship, h32 is set to unity for simplicity.

In a stereo camera coordinate system, the road surface (target plane) is represented as Z=0. Thus, the projection point of the point P (X, Y) on the road surface is represented by substituting Z=0.

$$u = \frac{h_{11}X + h_{12}Y + t_1}{h_{31}X + Y + t_3}, v = \frac{h_{21}X + h_{22}Y + t_2}{h_{31}X + Y + t_3} \quad (4)$$

A camera model is considered under the following premise here.

(a) A area comparatively far from the cameras is set to an object region (b) Position deviation of the right and left cameras along the Y axis is small.

With these assumptions, the following equation is established

Denominator of equation (4)=$Y+\beta+h31X+\Delta t3 \cong Y+\beta$

β is a Y-direction deviation of a coordinate origin with respect to a median of view points of the right and left cameras as shown in FIG. 5, and t3=β+Δt3. Accordingly, the equation (4) can be simplified as the following equation:

$$u \cong \frac{h_{11}X + h_{12}Y + t_1}{Y + \beta}, v \cong \frac{h_{21}X + h_{22}Y + t_2}{Y + \beta} \quad (6)$$

Further when Yc=Y+β, $$\begin{bmatrix} u \\ v \end{bmatrix} = \begin{bmatrix} h_{11} & t_1 - \beta h_{12} \\ h_{21} & t_2 - \beta h_{22} \end{bmatrix} \begin{bmatrix} X/Y_C \\ 1/Y_C \end{bmatrix} + \begin{bmatrix} h_{12} \\ h_{22} \end{bmatrix} \quad (7)$$

The matrix of the right-hand member is assumed to be M. When the intersection point (vanishing point) of white lines 11 and 12 is assumed t=(u0, v0), (h12, h22)T=t. Assuming that X=(X/Yc, 1/Yc)$^T$, and projection points of the point P on the road surface to right and left images are ul and ur, $$u_l - t_l = M_l X, u_r - t_r = M_r X \quad (8)$$

(tl, tr are vanishing points of the white lines). Thus, $$u_r - t_r = M_r M_l^{-1}(u_l - t_l) = A(u_l - t_l) \quad (9)$$

"l" and "r" are subscripts which refer to the right and the left images respectively. Because calibration of a stereo camera is not done, Ml and Mr are unknown. However, A is previously obtained from the feature point on the road surface having no tilt while the car is stopping.

Assume that a road plane varies from a reference plane Z=0 to an inclined plane Z=pY by a tilt change of a road at the time of travel motion and oscillation of a car. Generally, a slope in the X-direction is smaller than that in the Y-direction, it can be ignored. If a line intersection of an inclined plane and a target plane is assumed to be an X-axis, equation of the inclined plane can be expressed with Z=pY. A method of computing a road planarity constraint for Z=pY from movement of two white lines will be described hereinafter. When Z=pY is substituted for equation (4), a projection position (u', v') to an image of a point (X, Y, Z) on the inclined plane is expressed by the following equation under above-mentioned two assumptions.

$$u' = \frac{h_{11}X + (h_{12} + ph_{13})Y + t_1}{(1 + ph_{33})Y + \beta} \quad (10)$$

If a tilt is assumed minimal, that is, P=0, the following equation is established.

$$u' \simeq \frac{h_{11}X + (h_{12} + ph_{13})Y + t_1}{Y + \beta} \quad (11)$$

With Yc=Y+β, v' is subjected to equation transformation by the equation further (3), too.

$$\begin{bmatrix} u' \\ v' \end{bmatrix} = \begin{bmatrix} h_{11} & t_1 - \beta u'_0 \\ h_{21} & t_2 - \beta v'_0 \end{bmatrix} \begin{bmatrix} X/Y_C \\ 1/Y_C \end{bmatrix} + \begin{bmatrix} u'_0 \\ v'_0 \end{bmatrix} \quad (12)$$

$\Delta u = (\Delta u, \Delta v)^T = u - t$, $\Delta u' = (\Delta u', \Delta v')^T = u' - t'$ From equation (7)

$\Delta u = MX$

Therefore the above equation is expressed as follows, $= \Delta u + \beta / Yc \Delta t$ where $\Delta t = (\Delta u0, \Delta v0)^T = t - t'$ The following equation is established by equation (7).

$$X = M^{-1} \Delta u \quad (14)$$

$$M^{-1} = \begin{bmatrix} m_{11} & m_{12} \\ m_{21} & m_{22} \end{bmatrix} \quad (15)$$

In this case, $1/Yc = m21\Delta u + m22\Delta v$

Therefore, the equation (13) is expressed as follows:

$$\Delta u' = \begin{bmatrix} 1 + \beta_1 \Delta u_0 & \beta_2 \Delta u_0 \\ \beta_1 \Delta v_0 & 1 + \beta_2 \Delta v_0 \end{bmatrix} \Delta u \quad (16)$$

where $\beta 1 = m21\beta$, $\beta 2 = m22\beta$

Figure 7:
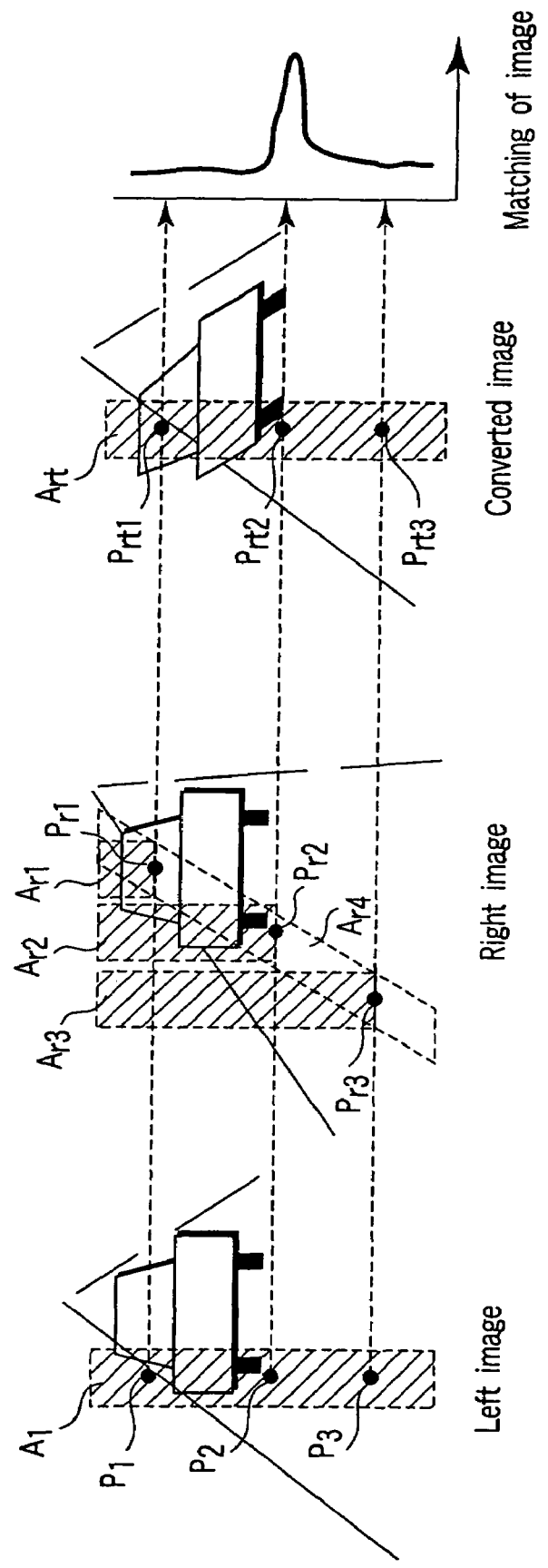
FIG. 7 is a diagram for explaining obstacle detection according to the first embodiment of the present invention.

If one of the white lines on the image changes from l1: $\Delta v = p1\Delta u$ to l'1: $\Delta v = p'1\Delta u'$ due to tilt as shown in FIG. 7, the following equation is established by equation (16).

$(p_1'\Delta u_0 - \Delta v_0)\beta_1 + p_1(p_1'\Delta_0 - \Delta v_0)\beta_2 = p_1 - p_1' \quad (17)$ Similarly, if the other (l2→l'2) of the white lines is subjected to transformation of equation, the following equation is provided.

$(p_2'\Delta u_0 - \Delta v_0)\beta_1 + p_1(p_2'\Delta u_0 - \Delta v_0)\beta_2 = p_2 - p_2' \quad (18)$ Two linear equations on $\beta = (\beta 1, \beta 2)T$ are obtained. If β is obtained, the matrix k of the equation (16) can be obtained. The projection position of a point on the road plane point is converted to $\Delta\mu'l = k1\Delta\mu1$, $\Delta\mu'r = Kr\Delta\mu r$ by a change of a tilt when the above process is done for each of the right and left images. Accordingly, the following equation is provided when the equation (9) is used.

$\Delta u_r' = K_r \Delta u_r = K_r A \Delta u_l = K_r A K_l^{-1} \Delta u_l' \quad (19)$ A of the equation (11) changes to A'=KrAKl−1. The equation (19) is a road planarity constraint to an inclined surface.

When a position of an arbitrary point on one of the right and left images is set as an input point and a road planarity constraint is applied to that point, the corresponding point computation unit 15 computes a position of the corresponding point of the input point on the other image, and output a result. The image transformation unit 16 transforms the right image as shown in FIG. 2 so that the region satisfying the road planarity constraint in the right image matches with the left image as shown in FIG. 3, using correspondence relation between the right and left images obtained by the corresponding point calculation part 15, to make a transformed image as shown in FIG. 4 and store it to the image storage unit 13.

Figure 6:
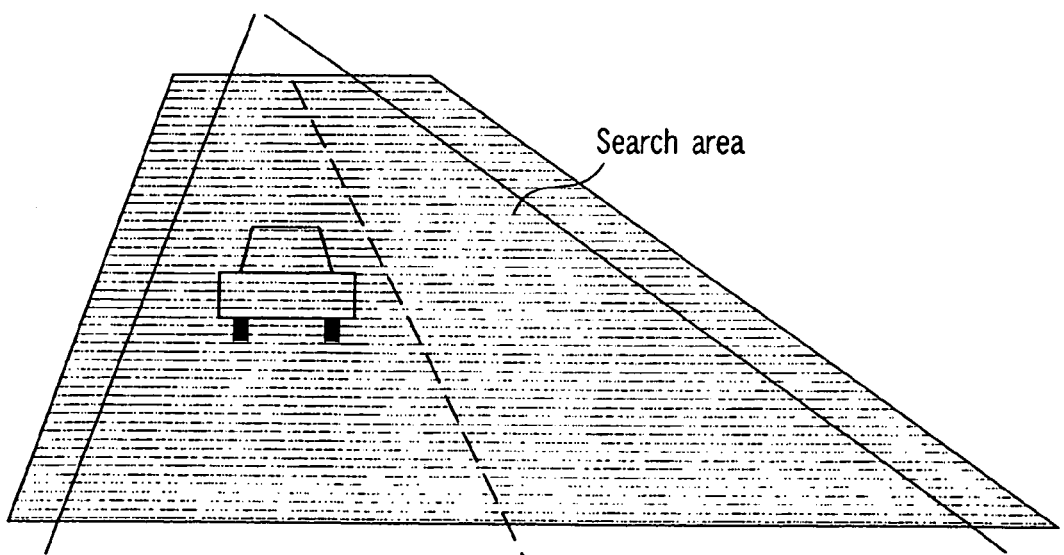
FIG. 6 is a diagram showing a search region to be searched with the obstacle detection apparatus.

The detector 17 sets an obstacle search region as shown in, for example, FIG. 6 to one image (for example, the left image), and determines whether points in the search region are obstacles or not.

The detector 17 detects an obstacle using the left image, right image and transformed image shown in FIG. 7 which are stored in the image storage unit 13. In this case, a vertical strip region A1 is set to the left image as shown in FIG. 7 and every hypothesized grounding position of an obstacle in the region A1 is tested whether or not there is an obstacle at the grounding position.

Suppose that a point P1 in the left image of FIG. 7 is a grounding position of an obstacle, and the points on the right image and transformed image of FIG. 7, which correspond to the point P1 of the left image are Pr1 and Prt1, respectively. In this case, the part of the region A1 above the point P1 corresponds to the region Ar1 of the right image shown in FIG. 7, and the part of the region A1 below the point P1 corresponds to a region below the point Prt1 of the region Art in the transformed image of FIG. 7. On the basis of this correspondence, matching between an image of the region A1 and the corresponding region in the right image and the transformed image are computed by normalized correlation or whatever method which computes goodness of a match between two partial images.

Likewise, suppose the point P2 in the left image of FIG. 7 is a grounding position of the obstacle, and the points of the right image and transformed image of FIG. 7, which correspond to the point P2 of the left image are Pr2 and Prt2, respectively. In this case, the region above the point P2 on the image of the region A1 corresponds to the right image region Ar2 of FIG. 7, and the region below the point P2 on the image of the region A1 corresponds to the region below the point Prt2 on the region Art of the transformed image of FIG. 7. On the basis of this correspondence relation, matching between an image of the region A1 in the left image of FIG. 7 and the corresponding region in the right image and the transformed image are computed by normalized correlation or whatever method which computes goodness of a match between two partial images.

Further, suppose the point P3 in the left image of FIG. 7 is a grounding position of the obstacle, and the points of the right image and transformed image of FIG. 7, which correspond to the point P3 of the left image are points Pr3 and Prt3, respectively. In this case, the region above the point P3 on the image of the region A1 corresponds to the region Ar3 of FIG. 7 and the region below the point P3 of the image of the region A1 corresponds to the region below the point Prt3 of the region Art in the transformed image.

On the basis of this correspondence relation, matching between an image of the region A1 in the left image of FIG. 7 and the corresponding region in the right image and the transformed image are computed by normalized correlation or whatever method which computes goodness of a match between two partial images.

As discussed above, when the above process is repeated varying the hypothesized grounding point from the top to the bottom, matching of the image with respect to each hypothesized grounding position is obtained as shown by a graph of the images of FIG. 7. In other words, suppose the point P1 is the grounding point of an obstacle. In that case, the image signal (luminance signal) of the region Ar1 of the right image is added to the image signal (luminance signal) of the region below the point Prt1 on the region Art of the transformed image, and the addition result is compared with the signal of the region A1 of the left image, the matching of the images is computed.

Similarly, suppose the point P2 is the grounding point of an obstacle. In that case, the image signal (luminance signal) of the region Ar2 of the right image is added to the image signal (luminance signal) of the region below the point Prt2 on the region Art of the transformed image, and the addition result is compared with the signal of the region A1 of the left image, the matching of the images is computed.

Similarly, suppose the point P3 is the grounding point of an obstacle. In that case, the image signal (luminance signal) of the region Ar3 of the right image is added to the image signal (luminance signal) of the region below the point Prt3 on the region Art of the transformed image, and the addition result is compared with the signal of the region A1 of the left image, the matching of the images is computed. As a result, a graph showing matching of images as shown in FIG. 7 is formed. When the grounding position is correctly assumed to be the point P2 of the left image of FIG. 7 by the graph, the correct correspondence relation between the region in the left image and the right and transformed images is provided, resulting in the highest match between the images.

The point which provides the highest match in the graph is assumed to be the grounding position of the obstacle in the region A1. If this procedure is repeated while shifting the vertical strip region A1 to the horizontal direction, it is possible to obtain in stable and accurate grounding positions of obstacles over the entire image.

Figure 8:
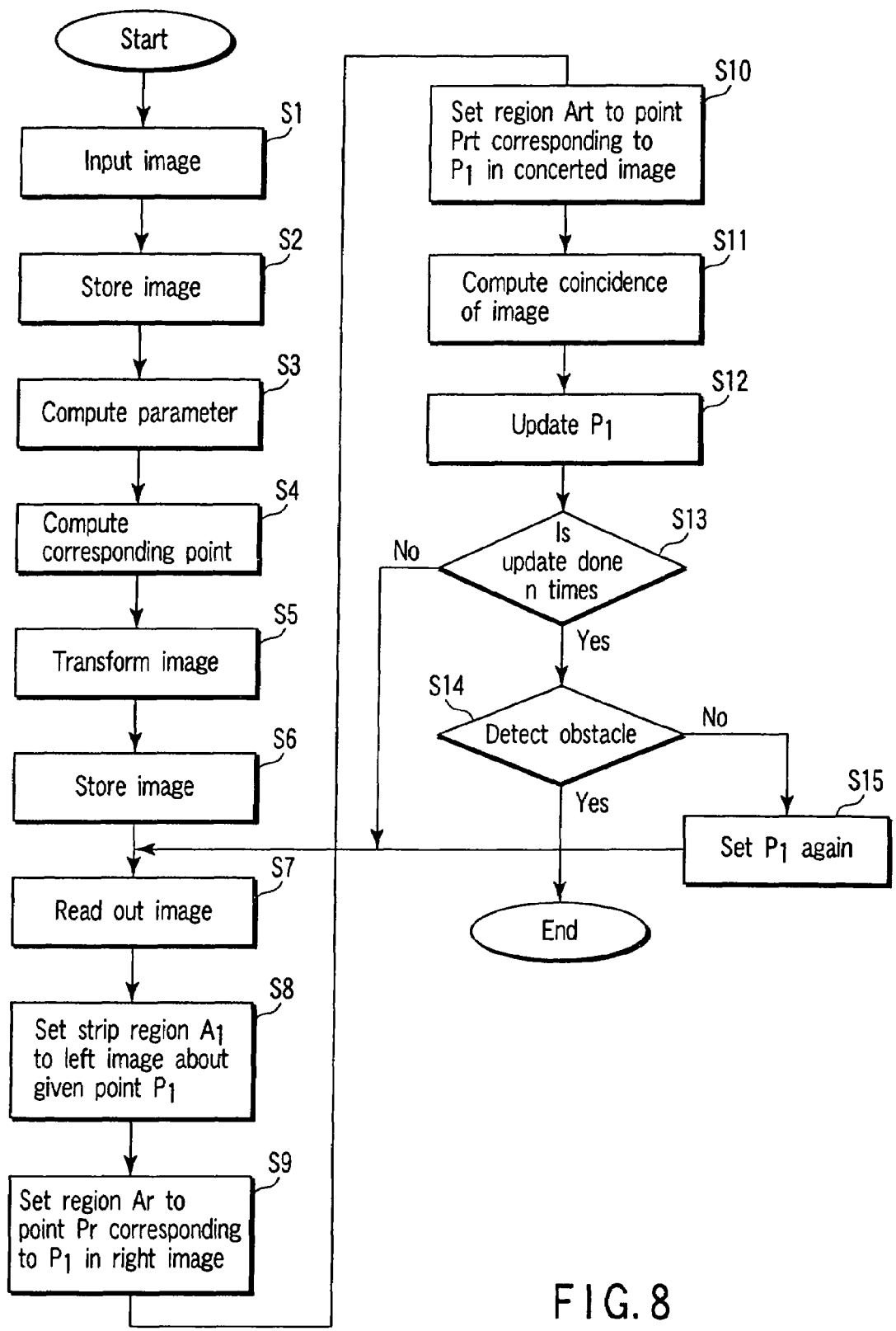
FIG. 8 is a flowchart for explaining obstacle detection according to the first embodiment of the present invention.

FIG. 8 shows the entire flow of obstacle detection according to the embodiment of the present invention. According to this, when right and left images are input from a video camera, they are stored in a memory (S1, S2). A parameter of road planarity constraint is computed based on the stored right and left images (S3). When the road planarity constraint parameter is applied to a point of the left image, the position of a point of the right image corresponding to the point of the left image is computed (S4). The right image is subjected to affine transformation to match with the left image using correspondence relation between a set point of the left image and the computed point of the right image. The transformed image is stored in the memory (S5, S6).

The stored image is read (S8), and the strip region A1 is set to the left image with respect to the point P1 of the left image as shown in FIG. 7 (S8). A region Ar (or Ar1) is set to the right image with respect to the point Pr (or Pr1) corresponding to the point P1 (S9). Further, a region Art is set to the transformed image with respect to the point Prt (or Prt1) corresponding to the point P1 (S10). The match of the images is obtained with respect to the region A1 of the set left image, the region Ar of the right image and the transformed image Art (S11).

The point P1 of the left image is updated to the point P2 in vertical direction (S12). It is determined whether the update is done n times (S13). When this determination is NO, and the process returns to step S7, the process of the steps S7 to S13 is repeated with respect to the point P2.

When the determination of step 13 is YES, obstacle detection is determined from the matching result of the images (S14). In this time, when there is a peak in a waveform showing the goodness of the match of the images, that is, obstacle detection is determined, the process is finished. However, if there is no peak in the waveform showing matching of the images, the point P1 of the left image is shifted in horizontal direction to be reset (S15), and the process from step 7 is done again.

When an obstacle is detected as described above, an obstacle detection signal is output. The obstacle detection signal is transmitted to a safety driving support apparatus or an automotive vehicle for supporting safety driving of a car.

It is possible to determine easily a car and motorcycle having a length in substantially vertical direction with respect to the road surface by setting a strip region having a given length in substantially vertical direction to a captured image as described in the above embodiment. They can be detected as obstacles to the moving car.

The present invention can realize a process shown in FIG. 8 by software as well as hardware. The present invention can be applied not only to a car running a general road or a highway but also to an automotive vehicle or automotive inspection vehicle, which moves a yard road, a tunnel or an indoor path.

Second Embodiment

The reason why general stereovision is not very reliable is that it tries to estimate depth for every pixel in an image. Since triangulation requires a point correspondence for each measurement, general stereovision is a problem of estimating N parameters from N data, where N is the number of pixels in an image. It is very difficult to obtain statistically stable estimation of the parameters in this problem setting.

For this reason, it is necessary to introduce a strong constraint and significantly reduce the number of parameters to be estimated. Consequently, the present embodiment uses not only road planarity constraint used in a plane projection stereo, but also obstacle planarity constraint, which gives correspondence between the left and right projections of a point which has a certain depth. The obstacle planarity constraint is given by the following equation (20) similar to the road planarity constraint.

$$u = \frac{g_{11}u + g_{12}v + g_{13}}{g_{31}u + g_{32}v + g_{33}}, v' = \frac{g_{21}u + g_{22}v + g_{23}}{g_{31}u + g_{32}v + g_{33}} \tag{20}$$

Figure 9:
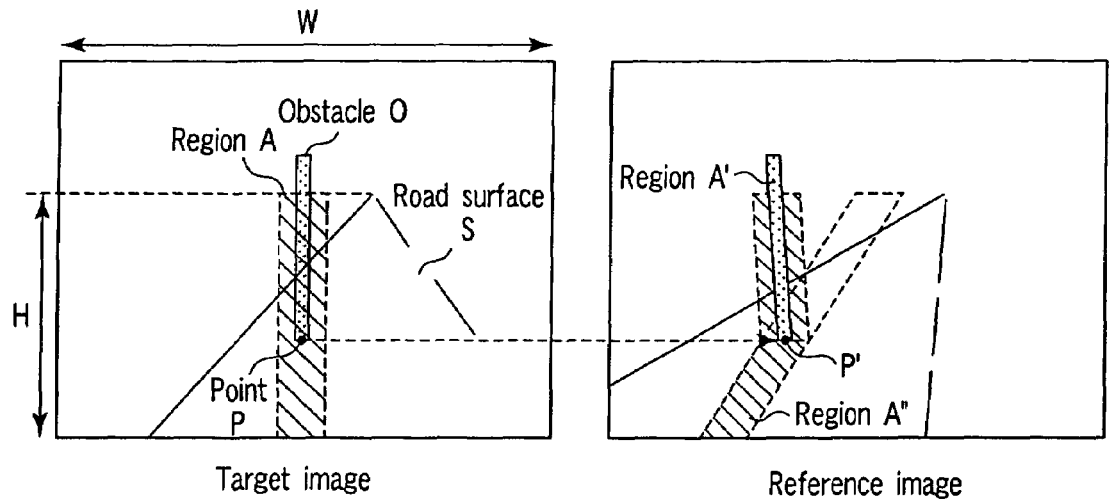
FIG. 9 is a diagram representing correspondence relation of a grounding position of an obstacle with a road surface and right and left images.

When the obstacle O stands perpendicular to the road surface S as shown in FIG. 9, and the grounding point to the road surface S of the obstacle O on the image 1 is assumed to be a point P, the corresponding point P' on the image 2 of the point P is given by the road planarity constraint equation of the equation (1). Then, the point on the obstacle O has the same depth as the point P due to the assumption that the obstacle stands perpendicular to the road surface. Accordingly, the parameter of the obstacle surface constraint equation (20) can be determined by the depth of the point P. As a result, the region A' in the reference image which corresponds to the partial region above the point P in a rectangular region A in the target image can be obtained by the obstacle surface constraint.

Because the partial region below the point P of the region A is the road surface, the region A" corresponding to the partial region in the reference image can be obtained by the road planarity constraint equation (1).

From the above, with the assumption that the obstacle stands perpendicular to the road surface, a single grounding point parameter uniquely determine the corresponding region in the reference image which corresponds to the region A in the target image.

Suppose the width of the target image and the height of the image below the horizon are W and H respectively and the image below the horizon in the target image is divided into W columns which have 1 pixel in width and H pixels in height. If one grounding point parameter is given to each column, correspondence relation from the target image to the reference image is uniquely determined. Match between two images is measured based on this correspondence relation, the obstacle can be detected by obtaining a series of grounding point parameters (boundary line between obstacles and the road surface) to maximize the match. This is a problem of estimating W parameters from a pair of images each which has W by H pixels. Since the number of data is much larger than the number of parameters to be estimated, statistically stable estimation can be obtained. Because this is optimization of one-dimensional function referred to as the grounding line, an optimization method of good efficiency such as Dynamic Programming can be applied to this embodiment.

Figure 10:
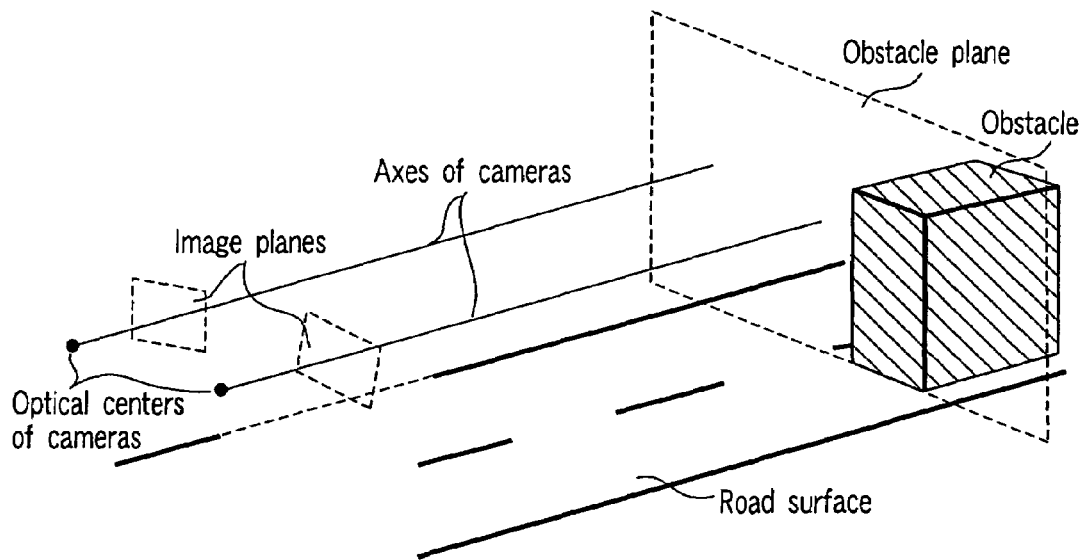
FIG. 10 is a diagram representing position relation of a road surface and an obstacle to right and left cameras.

The second embodiment of the present invention will be described referring to drawings. The present embodiment assumes circumstances detecting an obstacle existing on road surface, for example, a pedestrian, a preceding car, a parked vehicle using a stereo camera unit having right and left cameras mounted on a car similarly to FIG. 1. As shown in FIG. 10, the cameras are arranged so that the region in the three-dimensional space from which an obstacle is to be detected is included in the visual field of all cameras. The images captured with the right and left cameras respectively are stored in the storage device of a computer.

The optical axes of the two cameras are approximately parallel with each other. Further the plane including two optical axes is substantially parallel with the road surface. The cameras are arranged so that position deviation between two cameras with respect to the direction of the cameras optical axis is minute in comparison with the depth of the obstacle.

The above arrangement of the cameras largely decreases an arithmetic operation quantity required for conversion of the image and computation of correspondence relation between coordinates. Accordingly, if there is no constraint from the outside in regard to arrangement of the cameras, the above camera arrangement is preferable. However, it should be noted that the present embodiment is not limited to the above camera arrangement. It is preferable that the cameras are identical to each other in internal parameters such as focal distance or size of the image plane, but this is not always the necessary condition.

Figure 11:
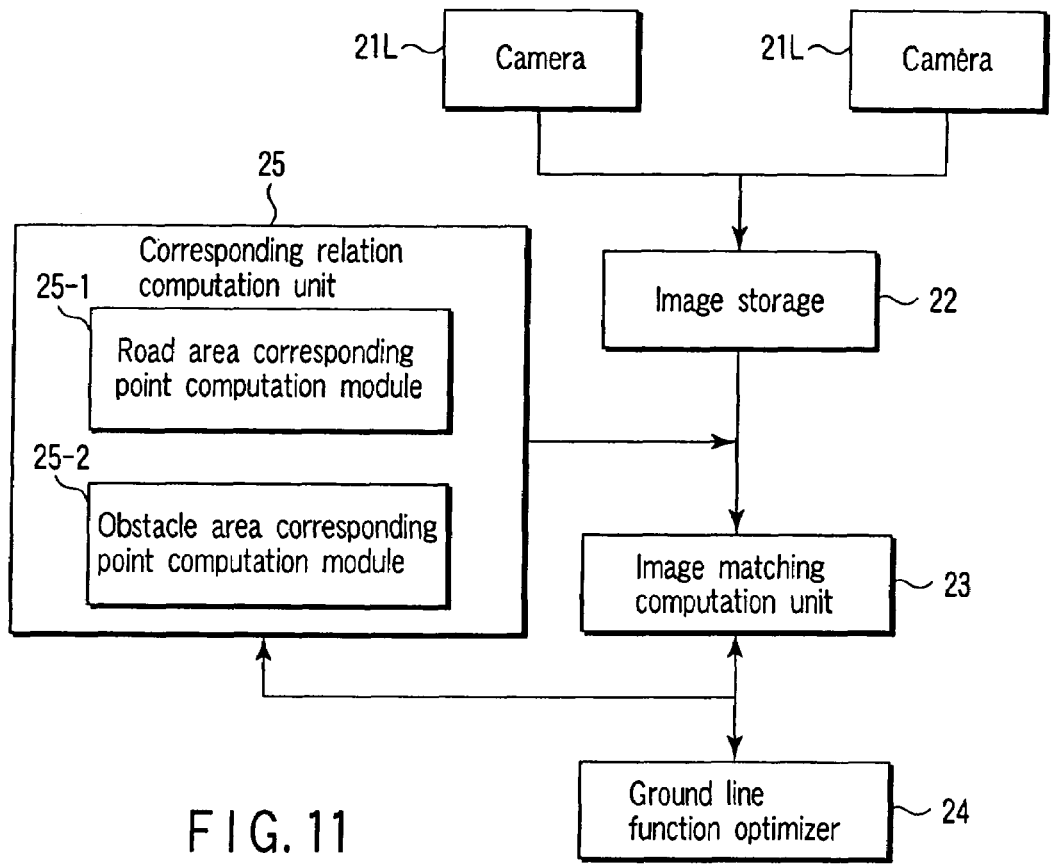
FIG. 11 is a block diagram of an obstacle detection apparatus of a second embodiment of the present invention.

FIG. 11 shows a block diagram of an obstacle detection apparatus of the present embodiment. Right and left cameras 21R and 21L are connected to an image storage unit 22 storing image signals output from the cameras. An image storage unit 22 is connected to an image matching computation unit 23 which computes matching between a target image and a reference image. The output port of the image matching computation unit 23 is connected to a boundary line function optimizer 24 and a correspondence computation unit 25.

The correspondence computation unit 25 computes correspondence between the target image and the reference image from the grounding position of the obstacle with the road surface in the road surface region of the target image. This correspondence computation unit 25 includes a road region corresponding point computation module 25-1 computing correspondence concerning the road surface region of target image, and an obstacle region corresponding point computation module 25-2 computing correspondence concerning the obstacle region of the target image.

The road region corresponding point computation module 25-1 computes at first a parameter of the road planarity constraint equation (1) by means of techniques described in Japanese Patent Laid-Open No. 2001-76128, the entire contents of which are incorporated herein by reference, and computes a coordinate (u', v') of the point of the reference image which corresponds to a coordinate (u, v) of a point in the target image, using the road planarity constraint equation (1).

Obstacle region corresponding point computation module 25-2 computes at first a parameter of the obstacle surface constraint equation (20) with respect to a designated depth d or a grounding point P of the road surface with the obstacle, and computes a coordinate (u', v') of the point of the reference image which corresponds to a coordinate (u, v) of a point in the target image, using the obstacle constraint equation (20). The parameter of the obstacle surface constraint equation (20) is computed as follows.

With the assumption that position vectors in two camera coordinate systems concerning the point P on the surface of the obstacle of a depth d are m=(X, Y, Z) and m'=(X', Y', Z') respectively, and a rotating matrix connecting two coordinate systems and a translation vector are R and t respectively, the following relation is established between vectors m and m'.

$$m' = Rm + t \quad (21)$$

If the point P lies on a plane of a depth d, the position vector m satisfies the following equation, where n is the unit vector representing the depth direction of one of the camera coordinate system:

$$n^T = d \quad (22)$$

The equation (21) can be transformed to the following equation (23) by substituting the equation (22) into the equation (21).

$$m' = \left(R + \frac{tn^T}{d}\right)m \quad (23)$$

When a focal length of a camera is assumed to be f, a coordinate of the point P on the right and left images is given by the following equation.

$$(u, v) = (fX/Z, fY/Z), (u', v') = (fX'/Z', fY'/Z') \quad (24)$$

We define a matrix G as follows:

$$\rightarrow G = R + \frac{tn^T}{d} = \begin{pmatrix} fg_{11} & fg_{12} & fg_{13} \\ fg_{21} & fg_{22} & fg_{23} \\ fg_{31} & fg_{32} & fg_{33} \end{pmatrix} \quad (25)$$

An equation (20) is provided from the equations (23), (24) and (25). If calibration of two cameras 21L and 21R is done, a rotating matrix R, a translation vector t and a depth direction n are known. Accordingly, if the depth parameter d is given, a parameter of the equation (20) is uniquely determined.

When a coordinate (u, v) of a projection point of the grounding point P of the road surface with the obstacle to one image instead of the depth parameter d is given as input, a coordinate (u', v') of a projection point of the point P to the other image is computed using the road planarity constraint equation (1). It is possible to obtain the depth d by triangulation using this correspondence.

As described above, when the optical axes of two cameras are approximately parallel, the plane including two optical axes is approximately parallel with the road surface, and the two cameras are mounted at approximately the same depth, the equation (20) is largely simplified.

When the arrangement of the cameras satisfies the above conditions, the depth direction almost coincides with the optical axes of the cameras. Accordingly, the obstacle surface is approximately parallel with the image plane, and a pattern on the obstacle surface is projected to the image plane of each of the right and left images by receiving only the same scale change. In this case, the coordinates (u, v) and (u', v') of the points P on the obstacles on the right and left images correspond to each other by the following equation using two-dimensional rotation matrix Q to associate with angles around the optical axes of the right and left camera coordinate systems, and the translation vector s. This is referred to as a simplified obstacle planarity constraint.

$$\begin{pmatrix} u' \\ v' \end{pmatrix} = Q \begin{pmatrix} u \\ v \end{pmatrix} + s \qquad (26)$$

A line parallel to the image planes of the cameras is drawn on the road surface beforehand, and an angle between the line segments of the line, which are projected on the right and left images is computed. This angle is assumed to be a rotation angle of the rotation matrix Q. Assuming that a relative position between the cameras does not change while the car is traveling. In this case, since the parameter of the rotating matrix Q is constant, the simplified obstacle planarity constraint changes only the translation vector s according to the position of the obstacle surface.

The translation vector s can be computed by giving a set of coordinates (u, v) and (u', v') of points concerning the point P on the obstacle surface and projected on the right and left images. In the point where the obstacle surface and the road surface cross to each other, the coordinates (u, v) and (u', v') can be provided by the road planarity constraint. Thus, if the grounding position of the obstacle with respect to the road surface is provided, correspondence between the projection images of the obstacle to the right and left images can be computed.

Figure 12:
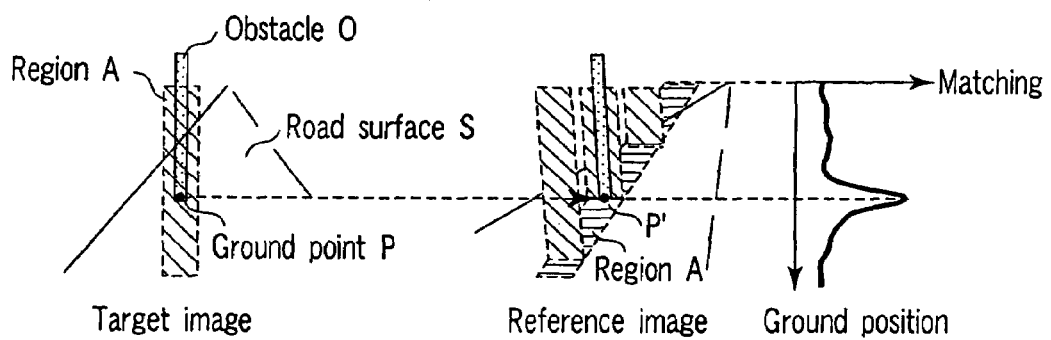
FIG. 12 is a diagram for explaining match between a target image and a reference image.
Figure 13:
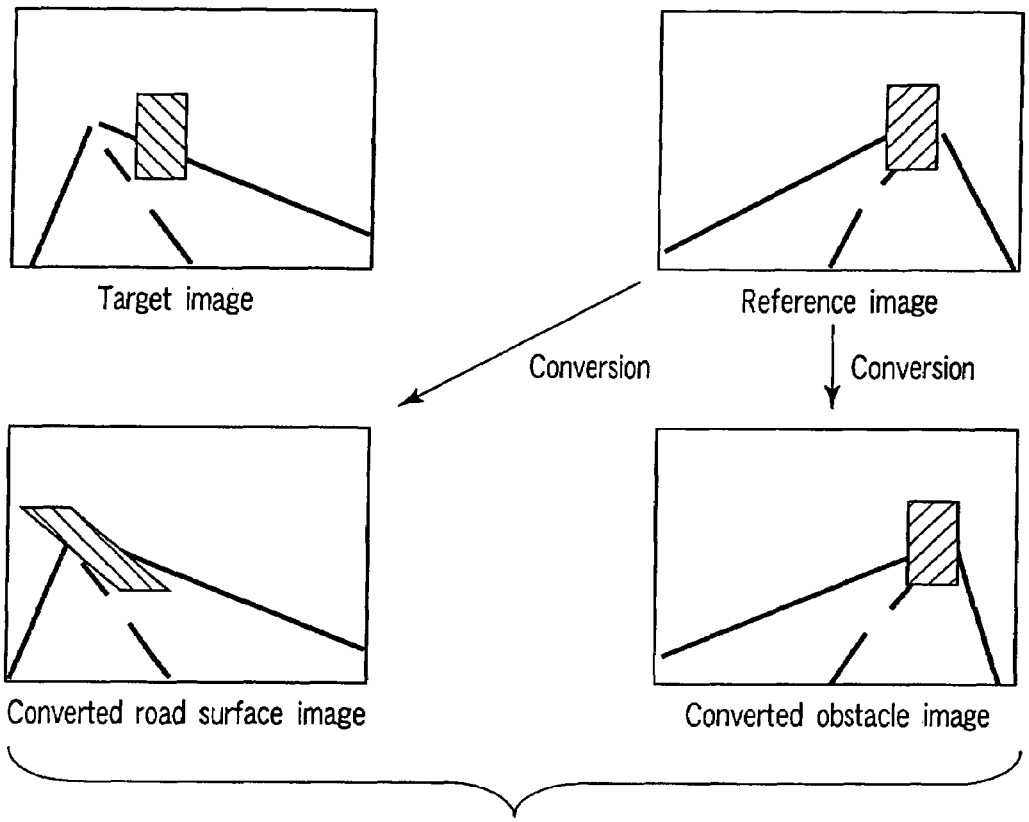
FIG. 13 is a diagram for explaining a transformed road surface image and a transformed road surface image.

When the image match computation unit 23 receives a target region image obtained by clipping a part of the target image such as the region A shown in FIG. 12, and a coordinate of a grounding point of the obstacle with the road surface on the target image as a parameter, it computes match between the target image and the image of the regions of the reference image which corresponds to it.

When the region below the grounding point of the target region image is assumed to be the road region, the region A" of FIG. 12 corresponding to it in the reference image is computed with the road region corresponding point computation module 25-1. The match between the regions is computed based on the correspondence and is output as road region matching value.

When the region above the grounding point of the target region image is assumed to have the same depth as the grounding point, the region A' of FIG. 12 corresponding to it in the reference image is computed with the road region corresponding point computation module 25-2. The match between the regions is computed based on the correspondence and is output as obstacle region matching value.

The matching value may be obtained by comparing, for example, brightness values of the corresponding points to output 1 when a brightness difference is less than a threshold, and otherwise 0. Alternatively, the matching value may be obtained by clipping small regions near the corresponding point, calculating normalized correlation between the regions, and carry out threshold processing similar to the above.

Because the brightness value is affected by various parameters such as relative position between a camera and a light source, or a value of an aperture of the camera, even if a set of correct corresponding points are detected, the brightness value may differ between the cameras. In such a case, it is preferable to use means for comparing the shapes of local images similar to normalized correlation of a small region rather than comparing brightness values directly.

However, in the case of comparing shapes, the shapes of the left and right images of a pattern on the road surface do not match because of deformation caused by planar projection. For this reason, even if a set of correct corresponding points are given, the shapes of the local images near the points do not match with each other. In such case, the road region corresponding point computation module 25-1 produces a road surface transformed image in which the road surface region of the reference image matches with road surface region of the target image.

The obstacle region corresponding point computation module 25-2 produces an obstacle surface transformed image in which the obstacle region having a constant depth in the reference image matches with the obstacle region having the same depth as the target image by translation. With the road surface region of the target region image below the boundary line between the road surface and obstacles, the road region corresponding point computation module 25-1 computes match between the road surface region and the road surface transformed image obtained by transforming the reference image. With the obstacle region above the boundary line in the target region image, the road region corresponding point computation module 25-2 computes match between the obstacle region and the road surface transformed image obtained by transforming the reference image.

In this case, as for the road surface region, the same road planarity constraint is used for the whole image. Therefore, the road surface image transformation needs to be done only once. However, as for obstacle region, the obstacle planarity constraint differs according to the grounding position of the obstacle to the road surface. Therefore, the obstacle surface transformation needs to be done several times. However, because this transformation is done to correct deformation of the image when matching value of the images is computed, it is not always necessary to generate the transformed image for all grounding positions, and only a few obstacle surface transformed images are sufficient.

Figure 14:
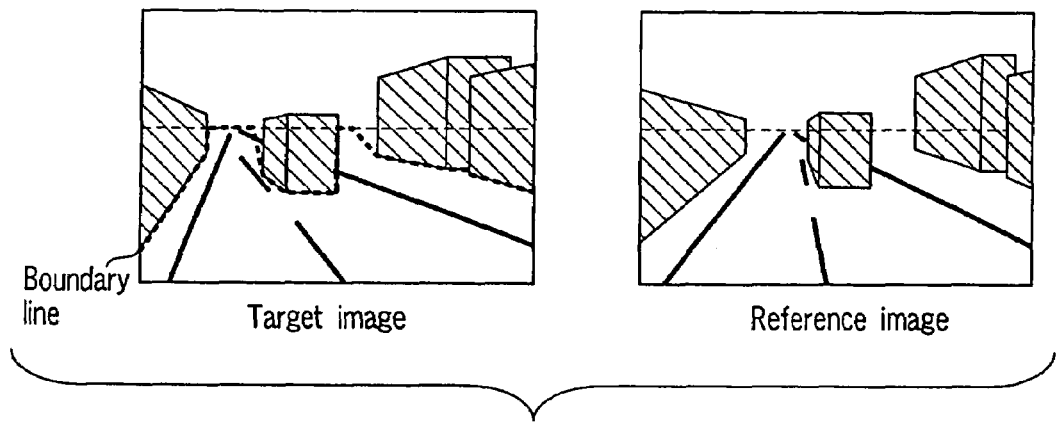
FIG. 14 is a diagram for explaining relation between a road surface, an obstacle and a boundary line of the road surface and the obstacle.

When simplified obstacle planarity constraint of the equation (26) is used, the grounding position of the obstacle differs due to only a difference of quantity of parallel displacement. Accordingly, the obstacle surface transformed image is generated only for a certain one grounding position decided properly, and the obstacle surface transformed image for another grounding position is creased by correcting the already created obstacle surface transformed image by the difference of the quantity of parallel displacement. In this case, obstacle surface transformation needs to be done only once When the boundary line function optimization module 24 sets a boundary line between the obstacle and the road surface to the road surface region on the target image as shown in FIG. 14, it computes a boundary line function to maximize match between the target image and the reference image which is computed with the image matching value computation unit 23, based on correspondence of target image and reference image calculated by correspondence computation unit 25.

Figure 16:
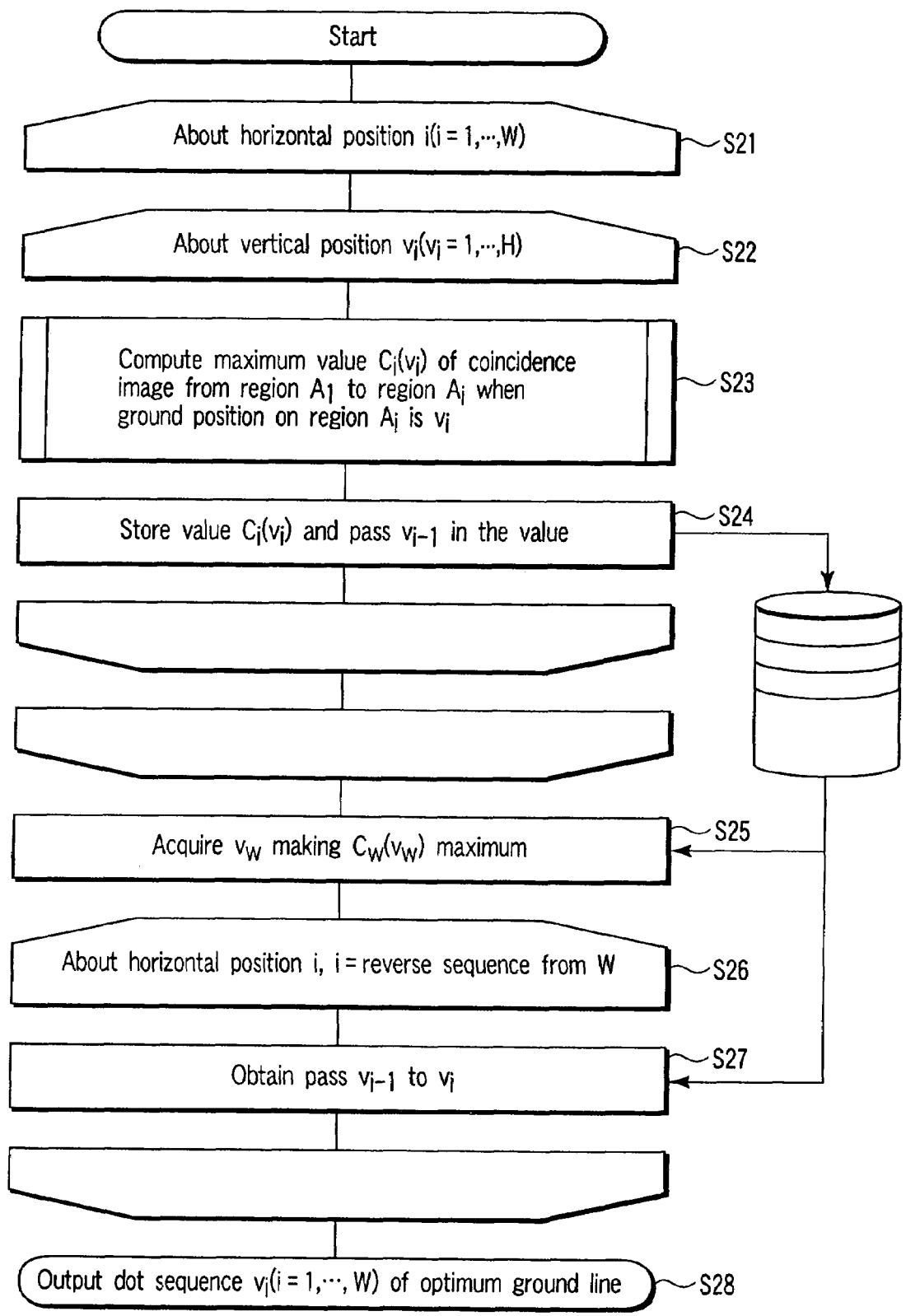
FIG. 16 is a flowchart of boundary line function optimization process.

There will now be explained an optimization method of a boundary line function using Dynamic Programming in the present embodiment referring to flowcharts of FIGS. 16 and 17. For convenience of explanation, an image of a left camera 21L is assumed to be a target image, and an image of right camera 21R is assumed to be a reference image.

Figure 15:
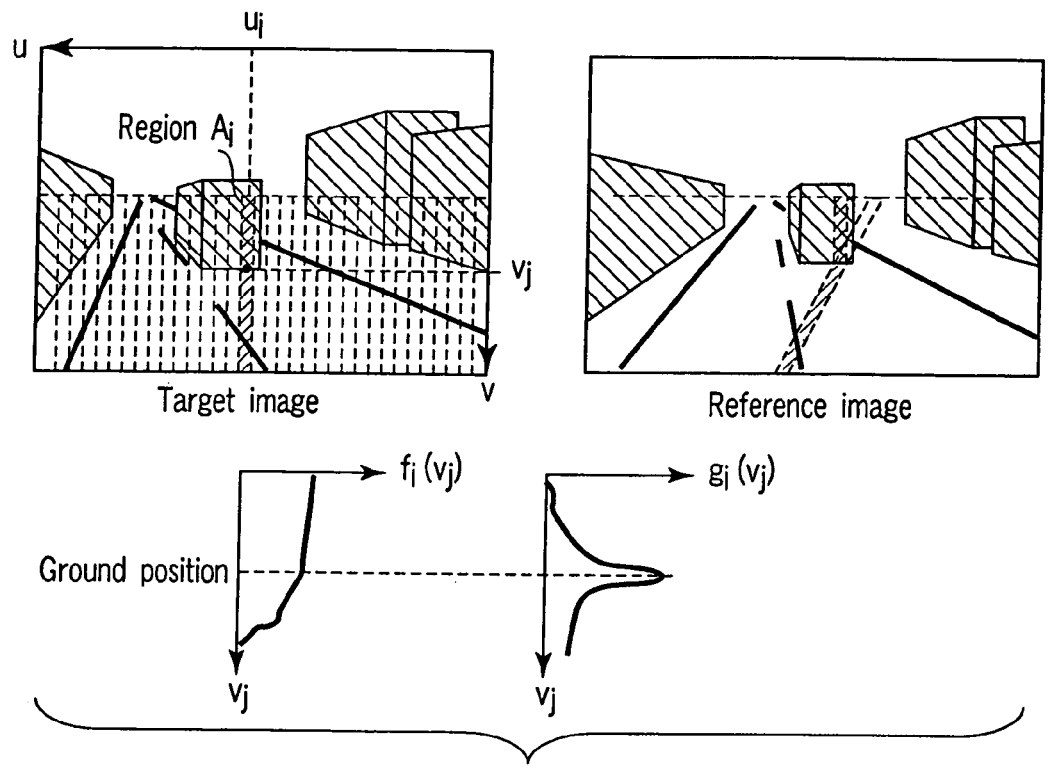
FIG. 15 is a diagram for explaining segmentation of an image into partial images and matching result of a partial image.

At first, the region below the horizon of the target image is divided into W columns $A_i$ (i=1, ..., W) as shown in FIG. 15 (step S21), and an ordinate $v_i$ ($v_i$=1, ..., H) of the grounding position is provided for each column Ai (step S22). Matching value $f_i(v_i)$ of the road region of the region Ai and matching value $g_i(v_i)$ of the obstacle region thereof are computed by the matching value computation unit 25 and the image match computation unit 23. In other words, the subroutine 1 is carried out to compute $C_i(v_i)$ which is the maximum matching value for regions from $A_1$ to $A_i$ when the grounding position in the region $A_i$ is $v_i$ (step S23).

Figure 17:
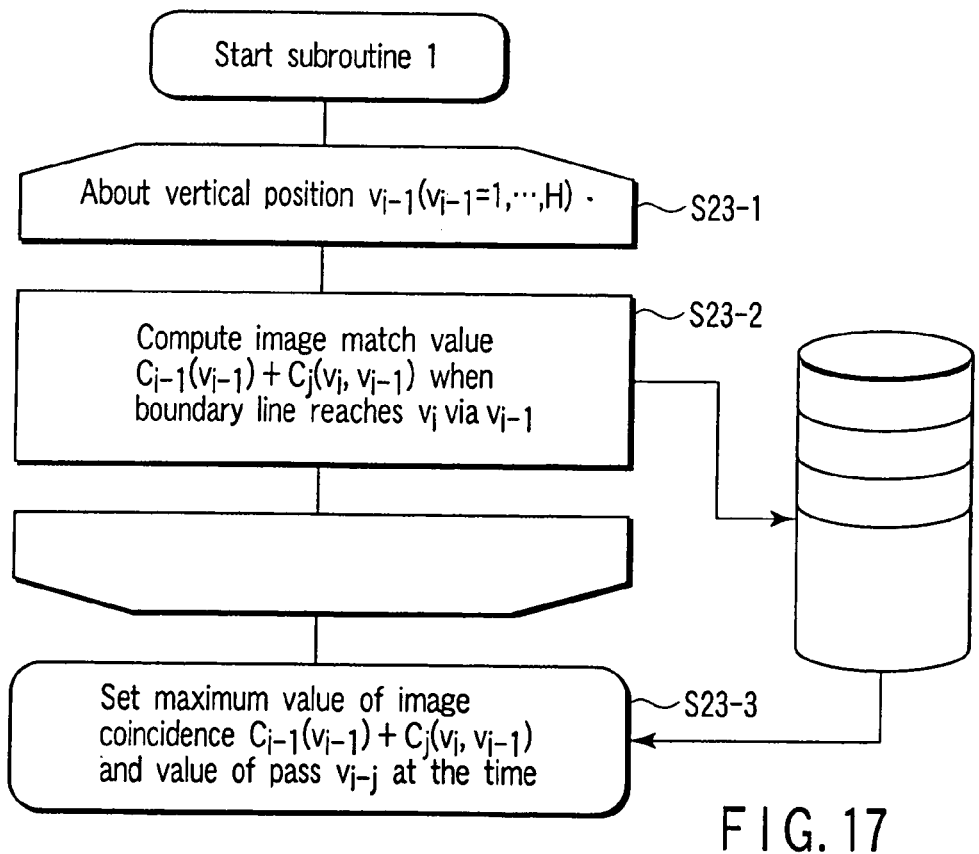
FIG. 17 is a flowchart of a subroutine 1 in the grounding line function optimization process.

The subroutine 1 provides an ordinate $v_{i-1}$ of the vertical position as shown in a flow of FIG. 17 (step 23-1), and computes matching $C_{i-1}(v_{i-1})+c_i(v_i, v_{i-1})$ of the image when the grounding line passes through $v_{i-1}$ and reaches $v_i$ (S23-2). This computed result is stored in a storage unit. Such a process is done repeatedly while varying $v_{i-1}$, and the maximum value of image match $C_{i-1}(v_{i-1})+c_i(v_i, v_{i-1})$ and the value of path $v_{i-1}$ at that time are obtained from the result and make a return value (S23-3).

In subroutine 1, assuming that the grounding position in the region $A_i$ is $v_i$, and matching value of the region Ai when the grounding position in the region $A_{i-1}$ is $v_{i-1}$ is $c_i(v_i, v_{i-1})$, the maximum value $C_i(v_i)$ of matching value from the region $A_1$ to the region $A_i$ when the grounding position in the region $A_i$ is $v_i$ is calculated. In this case, $C_i(v_i)$ is calculated recursively as follows:

$$C_1(v_1) = f_1(v_1) + g_1(v_1) \quad (27)$$
$$C_i(v_i) = \max_{v_{i-1}}\{C_{i-1}(v_{i-1}) + c_i(v_i, v_{i-1})\}, i > 1$$

In this time, the value of $C_i(v_i)$ and path $v_{i-1}$ at that time are stored in the storage unit (step S24). A series of grounding positions maximizing matching value of all regions are defined as follows:

$$v_i^*(i=1, \ldots, W)$$

The grounding position $v_W^*$ that maximizes the matching value at i=w is selected. In other words, $v_W^*$=arg max$_{v_W}$ $C_W(v_W)$ is selected (step S25).

A loop for computing the equation (28) while changing the horizontal position from i=W to i=1 is started (step S26). Then, the loop for computing the equation (28) is executed to compute the grounding position $v_{i-1}^*$ near the grounding position $v_i^*$ based on the recurrence equation (28) (step S27). In this time, in the initial process (i=w) of the step 27, the grounding position $v_{W-1}^*$ near the grounding position $v_W^*$ is computed.

$v_i^*$ are derived by the following recursive calculation:

$$v_W^* = \operatorname*{argmax}_{vW} C_W(v_W) \quad (28)$$
$$v_i^* = \operatorname*{argmax}_{vi}\{C_i(v_i) + c_{i+1}(v_{i+1}^*, v_i)\}, i < W$$

Figure 18:
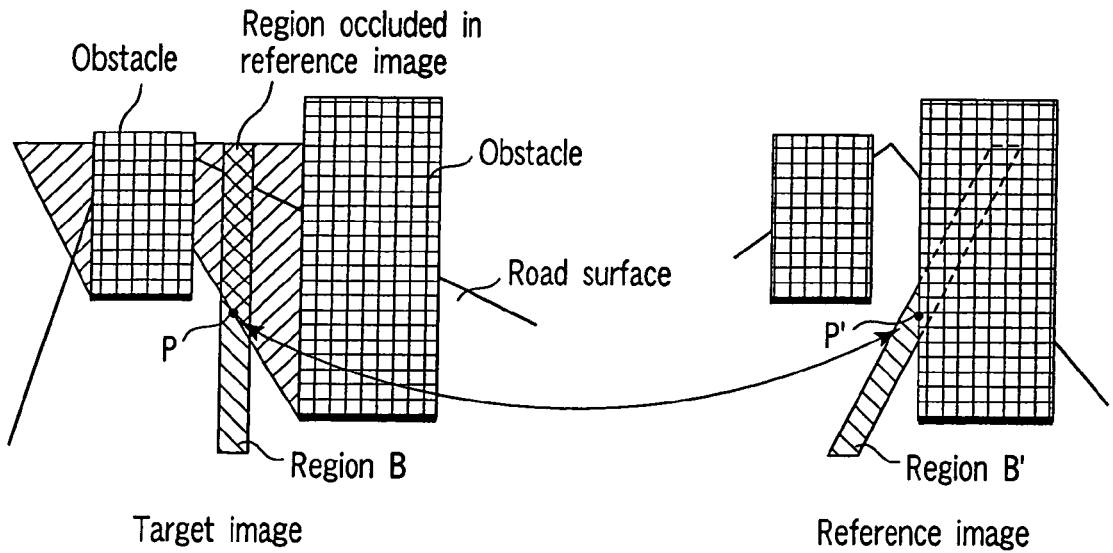
FIG. 18 is a diagram for explaining occlusion due to an obstacle.

The matching value $c_i(v_i, v_{i-1})$ of the region $A_i$ when the grounding position in the region $A_{i-1}$ is $v_{i-1}$ is $c_i(v_i, v_{i-1})=f_i(v_i)+g_i(v_i)$, when the entire region Ai is viewed from the reference image captured with the right camera. However, when an obstacle exists on the right side of the interest region such as the region B of FIG. 18, the obstacle further than the point P is not viewed from the right camera because of occlusion. The condition where such occlusion occurs is $v_i < v_{i-1} - \delta$, where $\delta$ is a constant which is determined based on the road planarity constraint equation. Taking this into account, $c_i(v_i, v_{i-1})$ is defined as follows:

$$c_i(v_i, v_{i-1}) = \begin{cases} -\infty & (v_i < v_{i-1} - \delta) \\ f_i(v_i) & (v_i = v_{i-1} - \delta) \\ f_i(v_i) + g_i(v_i) & (v_i > v_{i-1} - \delta) \end{cases} \quad (29)$$

The array of optimum grounding points $v_i^*$(i=1, ..., W) is obtained by the procedure described above (S28). In other words, the boundary line function which provides the best correspondence between the target image and the reference image is computed.

In the present embodiment, the optimization method using Dynamic Programming is described hereinbefore. However, another optimization method such as variational method can also be used for the calculation of the boundary line function.

As discussed above, the obstacle detection apparatus to explain in the present embodiment can accurately and robustly detect the grounding position of the obstacle to the road surface by computing the boundary line function to maximize match between the target image and reference image input from the cameras in turn.

Figure 19:
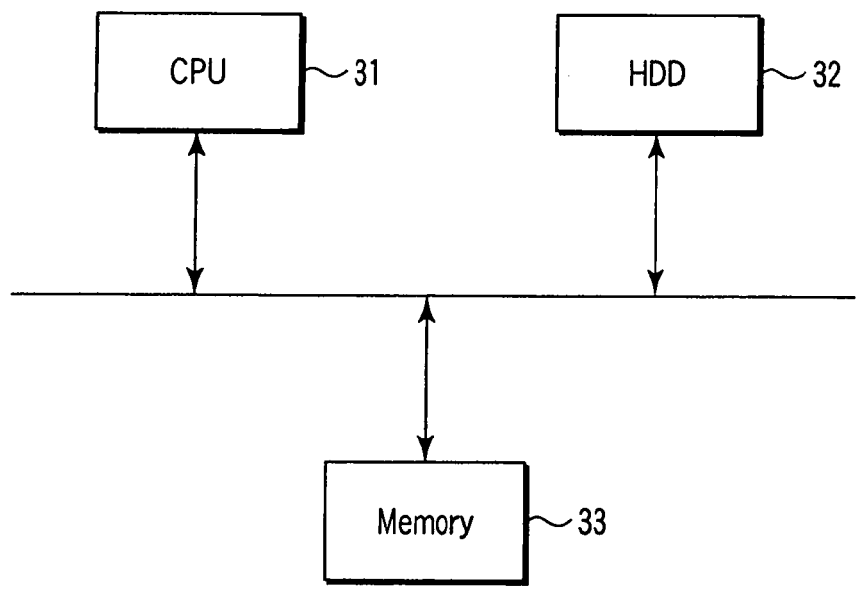
FIG. 19 is a block diagram of a processor to execute the present invention by software.

When the present invention is executed by software, a processor comprising CPU 31, HDD 32 and memory 33 as shown in FIG. 19 is used. A program to execute the embodiment and image information provided by the cameras are stored in the HDD 32. The program read from HDD 32 is stored to memory 33, and CPU 31 executes obstacle detection as reading the image information from HDD 32 according to the program stored to the memory 33.

According to the present invention, it is possible to detect obstacles on the road surface with high reliability and less computation by using the images acquired with multiple cameras mounted on a car.

According to the present invention, it is possible to detect the position of an obstacle existing on a road surface precisely and with high reliability. Since a complicated calibration required in general stereovision can be largely simplified similarly to a plane projection stereo method, a cost required for installation of an apparatus can be largely reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus to detect an object on a road surface, the apparatus comprising:
   a plurality of cameras each capturing an image;
   an image memory to store a plurality of images captured by the cameras, respectively;
   a dividing unit configured to divide a target image captured by one camera of the plurality of cameras into a plurality of stripe regions;

a correspondence computing unit configured to compute a correspondence between the target image and a reference image captured by another camera of the plurality of cameras for each of the stripe regions based on the plurality of stripe regions, when receiving a boundary line function representing a boundary between a road area and an obstacle area in the target image;

an image matching score computing unit configured to compute a matching score between a whole of the target image or a part thereof and a corresponding region of the reference image for each of the stripe regions based on the correspondence obtained by the correspondence computing unit; and a boundary line function optimization unit configured to generate an optimum boundary line function maximizing the correspondence with respect to the whole of the target image or the part thereof;

wherein the image matching score computing unit comprises:

a road surface image transformation unit configured to generate a road surface transformed image of the reference image wherein a pattern of the road region of the reference image matches with a pattern of the road region of the target image, and an obstacle image transformation unit configured to generate a transformed image of the reference image wherein a reference image pattern of an obstacle standing on the road surface matches with a target image pattern, and wherein when receiving a target region image representing the whole of the target image or the part thereof and a boundary line between the obstacle included in the target region image and the road surface, the matching score computing unit computes a matching score between a road surface region below a grounding line in the target region image and a road surface transformed image obtained by transforming the reference image with the road surface image transformation unit, and computes a matching score between an obstacle region above the grounding line in the target image and the obstacle surface transformed image obtained by transforming a reference image with the obstacle image transformation unit.

2. A method of detecting an object on a road surface, the method comprising:

capturing multiple images with multiple cameras, respectively;

storing the multiple images in a memory;

dividing, by a processor, a target image captured by one camera of the multiple cameras into multiple strip regions;

computing, by the processor, correspondence between the target image and a reference image captured by another camera of the multiple cameras for each of the strip regions, using a boundary line function representing a boundary between a road area and an obstacle area in the target image;

computing, by the processor, a matching value between a whole of the target image or a part thereof and a corresponding region of the reference image for each of the strip regions based on the correspondence obtained by the correspondence computing; and generating, by the processor, an optimum boundary line function maximizing the matching value with respect to the whole of the target image or the part thereof;

wherein computing the matching value comprises:

generating, by the processor, a road surface transformed image of the reference image wherein a pattern of a road region of the reference image matches with a pattern of a road region of the target image, and generating, by the processor, a transformed image of the reference image wherein a reference image pattern of an obstacle standing on the road surface matches with a target image pattern, and receiving the target image region which is the whole or the part of the target image and a boundary line between the obstacle included in the target image region and the road surface as input, and wherein the matching value computation includes computing a matching value between a part of the target image region below the boundary line and the road surface transformed image obtained by transforming the reference image by a road surface image transformation unit and computing a matching value between a part of the target image region above the boundary line and the obstacle surface transformed image obtained by transforming the reference image with an obstacle image transforming unit.

* * * * *